United States Patent

[11] 3,597,553

[72] Inventor Itsuki Ban
829, Higashi-Oizumimachi, Nerima-ku, Tokyo-to, Japan

[21] Appl. No. 869,808
[22] Filed Oct. 27, 1969
[45] Patented Aug. 3, 1971
[32] Priority Oct. 29, 1968
[33] Japan
[31] 43/78286

[54] AUTOMATIC TUNING APPARATUS FOR A COMBINATION RADIO AND TAPE PLAYER UNIT
5 Claims, 3 Drawing Figs.

[52] U.S. Cl. .......... 179/100.11, 325/471, 334/24
[51] Int. Cl. .......... G11b 31/00, H04b 1/32, H03j 3/00
[50] Field of Search .......... 179/100.11; 334/18, 20, 24, 25, 39; 325/471

[56] References Cited
UNITED STATES PATENTS

| | | | |
|---|---|---|---|
| 2,081,752 | 5/1937 | Linsell | 179/100.11 |
| 2,880,311 | 3/1959 | Bray | 325/471 |

OTHER REFERENCES
Billboard, 22 Apr. 1967, pp. 70— 71.

*Primary Examiner*—Bernard Konick
*Assistant Examiner*—Raymond F. Cardillo, Jr.
*Attorney*—Jacobs & Jacobs

ABSTRACT: An automatic tuning apparatus for a radio receiver in combination with a magnetic tape player comprising a first rotary member rotatable at high speed by rotational force of a magnetic tape drive including a capstan, a second rotary member rotatable at low speed in the direction reverse to the first rotary member by the magnetic tape drive, a swing lever with an idler wheel selectively abutting against the first and second rotary members for rotation, a tuning element such as a variable condenser for varying the radio receiving frequency and provided with an operating shaft rotatable with rotation of the idler shaft, and means for swingably controlling the swing lever.

The operating shaft of the tuning element is initially rotated at high speed when the idler wheel abuts against the first rotary member and then rotated at low speed when the idler wheel abuts against the second rotary member. Rotation of the operating shaft is automatically prevented when the idler wheel is away from the second lever at a position where the radio receiver is tuned to a broadcasting radio wave.

AUTOMATIC TUNING APPARATUS FOR A COMBINATION RADIO AND TAPE PLAYER UNIT

BACKGROUND OF THE INVENTION

The present invention relates to an automatic tuning apparatus for an automatic tuning apparatus for the radio receiver in combination with a magnetic tape player, and more particularly to such apparatus wherein by virtue of rotation of magnetic tape drive means including a capstan incorporated in the magnetic tape player, an operating shaft of a tuning element provided in a radio receiving circuit in rotated and rotation of the operating shaft is prevented at a position where the radio receiving circuit is tuned to the broadcasting radio wave. It has been well known to adapt a phonographic instrument to receive a radio cartridge, or to adapt a phonographic instrument to selectively play the magnetic tape or the radio. The radio receiver in such a phonographic instrument preferably has automatic tuning. Particularly, for the radio cartridge, it is required to provide a dial to drive the operating shaft of the tuning element such as variable condenser or a variable inductance for varying the receiving frequency in a narrow portion, and for this reason, the dial to be used is required to be a small size which is inconvenient Automatic tuning apparatus would be a distinct advantage.

One type of automatic tuning apparatus is such that there is provided pushbutton corresponding to a plurality of broadcasting radio waves and means for varying the tuning element of the radio receiving circuit automatically to tune to the broadcasting radio wave corresponding to a depressed push button. However, the provision of such type of the automatic tuning apparatus requires a greater space than can be provided in a radio cartridge. Another type of automatic tuning apparatus is such that the operating shaft is rotated by an electric motor and the motor is adapted to be responsive to the tuning signal of the radio receiving circuit and thus stop its rotation, This tuning signal is, for instance, the extreme value voltage of an automatic gain control (AGC) voltage of the radio receiving circuit. A disadvantage derived from the use of the automatic tuning apparatus of this class is such that the operating shaft of the tuning element is overrun and rotated due to inertia of the motor even if the motor is stopped in response to the tuning signal so that the tuning element is not set to a precise tuning position. In order to minimize the overrunning volume, reduction of rotational speed of the motor may be preferable. However, this causes reduction of the variable speed of the tuning element so that it takes much time to effect the tuning. Further, since the use of an electric motor suitable for automatic tuning is expensive, the use of the automatic tuning apparatus is also expensive.

SUMMARY OF THE INVENTION

It is a principal object of the present invention to provide an automatic tuning apparatus for a radio receiver in combination with a magnetic tape player wherein an operating shaft of a tuning element for varying the receiving frequency in a radio receiving circuit is rotated by magnetic tape drive means incorporated in the magnetic tape player, and rotation of the operating shaft is prevented at a position where the radio receiving circuit is tuned to the broadcasting radio wave.

Another object of the invention is to provide an automatic tuning apparatus for a radio receiver in combination with a magnetic tape player wherein the operating shaft is rotated at high speed to overrun a position for tuning the broadcasting radio wave to be received and then the rotational direction of the operating shaft is reversed and reduced, and rotation of the operating shaft is automatically prevented at a position for tuning with the broadcasting radio wave.

Still further object of the invention is to provide an automatic tuning apparatus for a radio receiver in combination with a magnetic tape player comprising a first rotary member rotatable at high speed by rotational force of the magnetic tape drive means of the magnetic tape player, a second rotary member rotatably driven at lower speed than the first rotary member, an idler wheel rotatably mounted on a swingable swing lever and rotated by selectively abutting against the first rotary member or the second rotary member in response to the swing of the swing lever, and a transmission device for imparting rotation of the idler wheel to the operating shaft of the tuning element whereby rotation of the operating shaft may be controlled with respect to swing of the swing lever.

Yet another object of the invention is to provide an automatic tuning apparatus for the radio receiver in combination with a magnetic tape player, including a sensing circuit for sensing that the radio receiving circuit is tuned to the broadcasting radio wave and for producing an electric pulse signal, wherein in response to the electric pulse signal the swing lever is swung from a position where the idler wheel abuts against the first rotary member to a position where the idler wheel abuts against the second rotary member, and the swing lever is caused to be responsive to the next electric pulse signal and returned to such a position where the idler wheel abuts against neither the first nor second rotary member.

According to the present invention, since the rotation of the operating shaft of the tuning element is made by rotational force of the magnetic tape drive means a separate motor for automatic tuning is not required and tuning time is shortened and precise tuning is effected due to rotation of the operating shaft from and to high and low speed.

Other object and advantages will become apparent from the following description of the exemplary embodiment of the invention illustrated in the drawing, in which:

DESCRIPTION OF THE PREFERRED EMBODIMENTS

Figure 1:
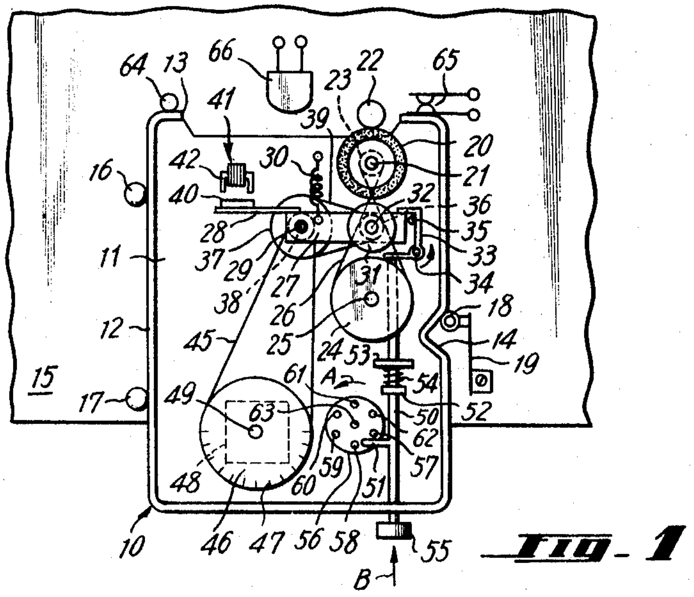
FIG. 1 is a schematic representation showing an embodiment of an automatic tuning apparatus of the invention for the radio receiver in combination with a magnetic tape player.

Referring to the drawing, particularly, to FIG. 1, numeral 10 indicates a radio cartridge in which an automatic tuning apparatus according to the present invention is provided and which is of a rectangular shape as the conventional endless magnetic tape cartridge (not shown) and is readily inserted in the tape or radio cartridge player and directly engaged in the play mode. The radio cartridge 10 has a baseplate 11 with upstanding walls 12 on all four sides. In one side 13, the wall and the baseplate have a series of cutouts. The top of the cartridge is covered by a transparent covering (not shown). Insertion of the radio cartridge 10 into a slot (not shown) in the tape or radio cartridge player results in that the cartridge is mounted on a horizontal deck 15 by means of guides 16, 17 and a retention guide 18 provided on the deck 15 as shown in the drawing. The retention guide 18 is provided with a leaf spring 19 on the deck and is urged by the bias of the leaf spring 19 into a notch 14 on the sidewall of the cartridge. Journaled to an upstanding pin or shaft 21 mounted on the baseplate 11 is a pressure roller 20 a portion of which is exposed out of the cutaway side 13 outwardly of the cartridge 10. The pressure roller 20 is adapted to be rotated by abutting against a capstan 22 which extends beyond the deck and is rotatably driven by a motor (not shown) as the radio cartridge 10 is in its play position as shown. The capstan serves to drivingly transport the tape in association with a pinch roller (not shown) in the tape cartridge in a case where the endless magnetic tape cartridge (not shown) is used in the tape or radio cartridge player. A small pulley 23 is mounted beneath the roller 20 on the shaft 21 so as to be rotated with the pressure roller 20. A larger pulley or wheel 24 is rotatably provided on a pin or shaft 25 extending from the plate 11 and is spaced from the pressure roller 20. A belt 25 extends between the wheel 24 and the pulley 23 so as to allow rotation of the pressure roller 20 to be imparted to the wheel 24. The wheel 24 is rotated at a smaller peripheral speed than that of the pressure roller 20 and assumes a rotational direction reversed to that of the pressure roller 20.

A swing lever 27 is provided at one end thereof with a leaf spring 28 and is swingably mounted on a shaft 29 extending upwardly from the baseplate 11. The swing lever 27 is urged in the counterclockwise direction by a tension spring 30. An idler wheel 31 is mounted on a shaft 32 which is rotatably provided through a bearing (not shown) on the swing lever 27. The idler wheel 31 is disposed adjacent the pressure roller 20 and the wheel 24 and is selectively engages the pressure roller 20 or the wheel 24 in accordance with movement of the swing lever 27. A substantially U-shaped lever 33 is pivoted by a pin 34 provided on the baseplate 11 and engages the swing lever 27 to block the rotation force of the swing lever 27 which is normally urged by the tension spring 30. The lever 33 is given the counterclockwise directional rotation force by the elasticity of a spring (not shown). This rotation of the lever 33 is prevented by a stopper pin 35. When the lever 33 engages the swing lever 27, the latter is maintained in a position where the idler wheel 31 is engaged with neither the pressure roller 20 nor the wheel 24. As will be described later, the swing lever 27 is swung in the counterclockwise direction by the bias of the tension spring 30 to allow the idler wheel 31 to abut against the pressure roller 20. A pulley 36 is rigidly mounted on shaft 32 and integrally formed pulleys 37, 38 are rotatably mounted on the shaft 29. A belt 39 extends between the pulley 36 and the pulley 37. With this arrangement, rotation of the idler wheel 31 which is rotated by engagement with the pressure roller 20 or the wheel 24 is transmitted to the pulley 38 via the shaft 32, pulley 36, belt 39 and the pulley 37.

Figure 2:
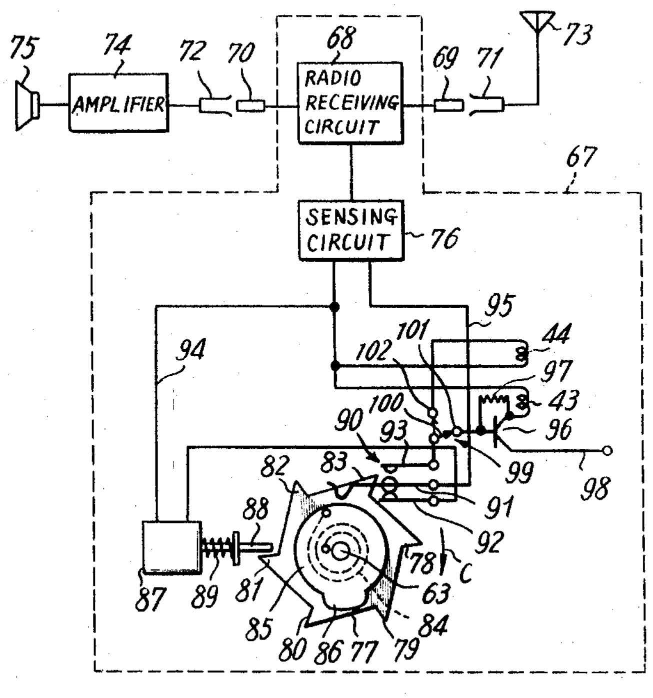
FIG. 2 is a schematic electric circuit diagram showing the apparatus shown in FIG. 1.

A magnetic piece 40 is fixed to the leaf spring 28 and on the baseplate 11 is secured an electromagnetic device 41 having a magnetic path with the open-end facing said magnetic piece 40. The magnetic piece 40 and the electromagnetic device 41 constitute means for locking the swing lever 27 against the elasticity of the tension spring 30. The electromagnetic device 41 is constituted by a core 42 having a first and second coils 43, 44 (FIG. 2). The mode of operation of the electromagnetic device 41 will be detailed later; however, it is noted that when the device 41 attractively holds the magnetic piece 40, the swing lever 27 is held in a position where the idler wheel 31 engages the wheel 24.

A belt 45 extends around the pulley 38 and a drum 46. The drum 46 is a cylindrical member in which upper end is closed and the lower end is opened. The drum 46 is provided at its surface with a tuning division 47 and covers a tuning element 48, like a variable condenser, and is mounted on an operating shaft 49 of the tuning element 48. The tuning element 48 is incorporated in a radio circuit (generally indicated at 68 in FIG. 2) in the radio cartridge 10. The receiving frequency of the radio receiving circuit is varied by rotation of the operating shaft 49. The tuning division 47 can be viewed through the transparent covering (not shown) of the radio cartridge 10.

A pushrod 50 with a boss 51 is slidably provided on a guide 53 on the baseplate 11. The forward end of the pushrod 50 is opposed to the lever 33 and the rearward end passes through a hole (not shown) formed in the rear sidewall 12 of the cartridge 10 and projects therefrom. Provided between a ring member 52 secured to the pushrod 50 and the guide 53 is a spring 54 of which the elastic force urges the pushrod 50 to a position where the tip end is in contact with the lever 33. A pushbutton is mounted on the other end of the pushrod extending from the radio cartridge 10. A disc 56 having six equally and circumferentially spaced pins 57 to 62 is mounted on a rotary shaft 63 rotatably provided through a bearing (not shown) on the baseplate 11. The disc 56 is adapted to be rotated in the direction of the arrow A each time that the pushbutton 55 is depressed in the direction of the arrow B whereby one of the pins 57 to 62 is pushed by the boss 51 of the pushrod 50. The disk 56 is capable of rotatably restoring itself, as will be further described later, upon rotation thereof in the direction of the arrow A as mentioned. On the deck 15, a stopper 64 for properly bringing the radio cartridge 10 to the play position, a door switch 65 actuatable by the forward corner of the radio cartridge 10, and a magnetic head 66 engageable with the endless magnetic tape stored within the tape cartridge (not shown) when presented in place of the radio cartridge 10 are provided. The door switch 65 is closed upon actuation thereof by the radio cartridge 10 or the endless magnetic tape cartridge (not shown). Closing of the door switch 65 supplies the tape or the radio cartridge player with the electric power.

Parts encircled by dotted line, indicated at 67 in FIG. 2 are provided within the radio cartridge 10. Numeral 68 designates a radio receiving circuit with the tuning element 48 as previously explained. The radio receiving circuit includes an antenna terminal 69 and an output terminal 70. The antenna terminal 69 and the output terminal 70 are respectively provided externally of the sidewall 12 of the radio cartridge 10 and are caused to be in electrical contact with contacts 71, 72 on the deck 15 when the radio cartridge 10 is brought to the play position. The contact 71 is connected to an antenna 73 and the contact 72 is in turn connected to an input side of an amplifier 74. The amplifier 74 serves to amplify the output signal of the radio receiving circuit 68 in the radio receiving and to amplify the output signal of the magnetic head 66 when reproducing the magnetic tape. A speaker 75 is connected to the output side of the amplifier, local oscillator, mixing circuit, intermediate frequency amplifier, and etc. The tuning element 48 (FIG. 1) is the circuit component in the radio frequency amplifier and the local oscillator. Numeral 76 is a sensing circuit for sensing the tuning signal to generate the electric pulse signal when it tunes with the radio wave. The tuning signal is, for instance, the automatic gain control (AGC) voltage of the radio receiving circuit 68. That is, the sensing circuit 76 may serve to generate the electric pulse signal with the extreme value of the AGC voltage when the radio receiving circuit 68 tunes with the radio wave. The operating power for the radio receiving circuit 68 and the sensing circuit 76 is supplied from a power supply (not shown) through contacts (not shown) mounted externally of the sidewall of the radio cartridge 10 and contacts (not shown) provided on the deck 15.

Numeral 77 indicates a ratchet wheel which is mounted on the rotary shaft 63 of the disc 56 (FIG 1) and provided with six teeth 78 to 83. The ratchet wheel 77 is given the rotation force in the direction of the arrow C by the elasticity of the coil spring 84. A cam 85 with its projection 85 is mounted on the rotary shaft 63. The rotation force of the rotary shaft 63 by the coil spring 84 is blocked by engagement of the teeth in the ratchet wheel 77 with the plunger 88 of the solenoid 87 fixed to the baseplate 11 (FIG. 1). When the solenoid 87 is energized, the plunger 88 is moved against a spring 89 to a position where the plunger is not engaged by the teeth in the ratchet wheel 77, and the rotary shaft 63 is rotatably driven in the clockwise direction by the elasticity of the coil spring 84. The solenoid 87 is energized by the output electrical pulse signal of the sensing circuit 76 through an electric switch 90 having a movable contact 91 which is actuated by the projection 86 of the cam 85. One power terminal (not shown) of the solenoid 87 and the other power terminal (not shown) thereof are connected through the fixed contact 92 of the switch 90 and the movable contact 91 thereof to a minus line 94 of the output of the sensing circuit 76 and a plus line 95 of the output thereof. The electric switch 90 is such that the movable contact 91 contact with the fixed contact 92 is in and opened is from the fixed contact 92 when the movable contact 91 is actuated by the projection 86 of the cam.

The first coil 43 of the electromagnetic device 41 (FIG. 1) is connected at one end thereof to the minus line 94 and at the other end thereof to the collector electrode of PNP transistor 96. A resistor 97 is connected to the base electrode and the collector electrode of the transistor 96, and the emitter electrode is connected to a plus line 98 of the power supply (not shown). Accordingly, the first coil 43 of the electromagnetic device 41 is normally supplied with a relatively weak current via the transistor 96. The intensity of the magnetic flux generated in the first coil 43 is normally so adapted that it can attract intensely and engage with the magnetic piece 40 on the leaf spring 28 when the open end of the magnetic circuit of the core 42 is closed by the magnetic piece 40, but it cannot contact the magnetic piece 40 when the magnetic piece 40 is away from the core 42. The base electrode of the transistor 96 is connected through a fixed contact 101 and a movable contact 100 of the change switch 99 of the fixed contact 93 of the switch 90. The change switch 99 is fixed to the baseplate 11 (FIG. 1) and actuated by the swing lever 27 in a position where the latter in engaged by the electromagnetic device 41. The switch 99 which has not been actuated by the swing lever 27 allows the movable contact 100 to be in contact with the fixed contact 101. If the switch 99 is actuated by the swing lever 27, the contact 100 is in contact with a fixed contact 102. When the base electrode of the transistor 96 is electrically connected through the switches 99, 90 to the plus line 95 and the output electric pulse signal is generated from the sensing circuit 76, the current drained from the emitter of the transistor 96 to the collector thereof is increased and a large current is applied to the first coil 43. As thus the large current is applied to the first coil 43, a large flux is generated from the coil 43, and the magnetic piece 40 on the leaf spring 28 is attracted by the electromagnetic device 41 against the elastic force of the tension spring 30. As soon as the magnetic piece 40 engages the electromagnetic device 41, the switch 99 is actuated by the swing lever 27 as previously mentioned to open the movable contact 100 and the fixed contact 101, and the movable contact 100 is in contact with the fixed contact 102.

Where the output electric pulse signal of the sensing circuit 76 is lost after lapse of a predetermined period or the movable contact 100 and the fixed contact 101 are opened, the large current is not applied to the first coil 43 while the weak current is continuously supplied to the first coil 43. Consequently, after which the magnetic piece 40 is maintained in a state of being attracted by and engaged with the electromagnetic device 41 by means of the weak current. The second coil 44 of the electromagnetic device 41 is so adapted that one end is connected to the minus line 94 and the other is connected to the first contact 102 of the switch 99. Therefore, when the switch 90 is in a state that the movable contact 91 and the fixed contact 93 are closed and on the other hand the switch 99 is in a state that the movable contact 100 and the fixed contact 102 are closed, the output signal of the sensing circuit 76 is applied to the second coil 44. The direction of current flowing in the second coil 44 is such that it eliminates the magnetic flux generated in the first coil 43, so that when the magnetic piece 40 is attracted by the core 42 and the output pulse current from the sensing circuit 76 flows in the second coil 44 whereby the attraction of the magnetic piece 40 is released.

Now, the mode of operation of the apparatus shown in FIGS. 1 and 2 will be described hereinafter.

Assume that the radio cartridge 10 is brought to the deck 15 as shown, the door switch 65 is closed to actuate the tape or radio cartridge player and thus rotatably drive the capstan 22. And, the pressure roller 20 abuts against the capstan 22 thus rotating the roller 20 at high speed and the wheel 24 at low speed in the direction reversed to that of the roller. At initial stage that the radio cartridge 10 is brought to the deck 15, the radio receiving circuit 68 is caused to tune to a certain broadcasting radio wave and on the other hand rotation of the swing lever 27 in the counterclockwise direction under the influence of the tension spring 30 is blocked by the lever 35. Further, the tooth 78 in the ratchet wheel 77 engages the plunger 88 of the solenoid 87 and the movable contact 91 of the switch 90 is actuated by the projection 86 of the cam 85 whereby the movable contact 91 is in contact with the first contact 93.

If another broadcasting radio wave after next is desired, the pushbutton 55 of the pushrod 50 is manually and pressedly operated in the direction of the arrow B, e.g. three times, to allow the boss 51 of the pushrod 50 to successively abut against the pins 57 to 59 on disc 56 so that the disc is rotated in three steps in the direction of the arrow A against the bias of the coil spring 84. The ratchet wheel 77 is rotated with rotation of the disc 56 is rotated, as shown in FIG. 2, to a position where the projection 86 does not actuate the movable contact of the switch 90. As the pushbutton 55 is depressed, the pushrod 50 rotates the lever 33 in the clockwise direction to release the swing lever 27 from engagement with the lever 33 and thus swing the swing lever 27 in the counterclockwise direction under the bias of the tension spring 30 whereby the idler wheel 31 abuts against the pressure roller 20. With this abutment, the idler wheel 31 is rotatably driven and rotation thereof is transmitted through a speed reducing device comprising the pulley 36, belt 39, pulleys 37, 38, belt 45, and the drum 46 to the operating shaft 49 of the tuning element 48 thereby rotating the operating shaft 49 as shown in the counterclockwise direction at high speed. Consequently, the receiving frequency of the radio receiving circuit 68 is varied and tunes with the next broadcasting radio wave so that the AGC voltage of the radio receiving circuit 68 reaches its extreme value thereby generating the electric pulse signal from the sensing circuit 76. As a result that the electric pulse signal is applied through the contacts 91, 92 of the switch 90 to the solenoid 87, the plunger 88 is instantly reciprocated. As the plunger 88 is thus reciprocated, engagement of the plunger 88 with the tooth 81 is released, and the ratchet wheel 77 keeps it rotation in the direction of the arrow C until the tooth 80 engages the plunger 88. When the operating shaft 49 of the tuning element 47 is further rotated and the receiving frequency of the radio receiving circuit 68 tunes with the next but one broadcasting radio wave, the electric pulse signal is again generated from the sensing circuit 76 and then the solenoid 87 is energized by the signal to reciprocate the plunger 88. Accordingly, the ratchet wheel 77 will rotate in the direction of the arrow C until the tooth 79 engages the plunger 88. When the operating shaft 49 of the tuning element 47 is further rotated and the receiving frequency of the radio receiving circuit 68 tunes with the broadcasting radio wave after next, the electric pulse signal is again generated from the sensing circuit 76 and then the solenoid 87 is energized by the signal to reciprocate the plunger 88. Therefore, the ratchet wheel 77 is rotated in the direction of the arrow C until the tooth 78 engages the plunger 88. When the ratchet wheel 77 is rotated to a position where the tooth 78 engages the plunger 88, the projection 86 of the cam 85 actuates the movable contact 91 of the switch 90 to allow the movable contact 91 to be away from the fixed contact 92 and to be in contact with the fixed contact 93. When the operating shaft 49 of the tuning element is further rotated and the receiving frequency of the radio receiving circuit 68 tunes with the two broadcasting radio waves after next, the electric pulse signal is generated from the sensing circuit 76. As a result that this electric pulse signal is applied through the contacts 91, 93 of the switch 90 and the contacts 100, 101 of the switch 99 to the base electrode of the transistor 96, the large current is drained to the first coil 43 of the electromagnetic device 41 to allow the latter to attract the magnetic piece 40. Thus, the swing lever 27 is rotated in the clockwise direction against the bias of the tension spring 30 and engages the electromagnetic device 41 at the same time the idler wheel 31 is away from the pressure roller 20 and abuts against the wheel 24 which rotates in the direction reversed to the pressure roller 20. With abutment of the idler wheel 31 with the wheel 24, the operating shaft 49 is rotated at low speed in the direction reversed to that so far. Due to this rotation of the operating shaft 49, the receiving frequency of the radio receiving circuit 68 tunes with the above broadcasting radio wave after next, and thus the electric pulse signal is generated from the sensing circuit 76. This electric pulse signal is applied to the second coil 44 of the electromagnetic device 41 through the contacts 91, 93 of the switch 90 and the contacts 100, 102 of the switch 99 which is actuated by the swing lever 27 retained by the electromagnetic device 41. Therefore, a current flows in the second coil 44, and a magnetic flux is derived from the second coil. The flux derived from the first coil 43 is cancelled by this flux, and the attractive engagement of the magnetic piece 40 by the electromagnetic device 41 is released whereby the swing lever 27 is returned by the elastic force of the tension spring 30 to a position where the lever 27 engages the lever 33. With return of the swing lever 27, the idler wheel 31 is retracted from the wheel 24 to prevent rotation of the operating shaft 49. That is, the tuning element 48 is automatically set to a position where the radio receiving circuit 68 receives the aforementioned broadcasting radio wave after next, and automatically tunes therewith.

As clearly from the foregoing description, the tuning element 48 may be varied at high speed until the radio receiving circuit 68 tunes with the broadcasting radio wave next to the one desired to be received, thereupon the variable direction of the tuning element is automatically reversed but varied at low speed and is set to a position where the radio receiving circuit 68 tunes with the desired broadcasting radio wave. It will be understood from this that tuning of the radio receiving circuit 68 is effected in a precise manner without overrun of the variation of the tuning element 48. According to the aforementioned explanation, the radio receiving circuit 68 can tune with the broadcasting radio wave after next since the pushbutton 55 is pressedly operated three times, however, it will readily be understood that when the pushbutton is pressedly operated twice, the radio receiving circuit 68 may tune with the next but one broadcasting radio wave.

Figure 3:
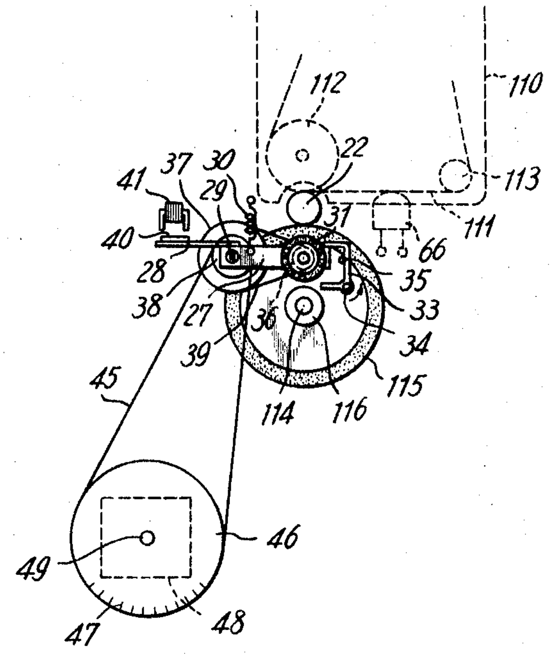
FIG. 3 is a representation schematically showing another embodiment of an automatic tuning apparatus of the invention for the radio receiver in combination with the magnetic tape player.

FIGS. 1 and 2 show the radio cartridge having the automatic tuning apparatus according to the present invention. FIG. 3 illustrates an instance where the automatic tuning apparatus according to the present invention is incorporated into the magnetic tape playing apparatus having a radio receiver. For facilitating understanding, similar numerals are used to illustrate like parts in FIGS. 1 and 2.

The magnetic tape playing apparatus with radio receiver is adapted to play the endless magnetic tape cartridge 110 which is shown as having been brought into the playing position, indicated by the dotted line in the drawing. The tape cartridge 110 includes a generally rectangular housing with a centrally disposed reel assembly (not shown) on which an endless magnetic tape 111 is wound and unwound in conventional manner. The endless tape 111 passes over a pinch roller 112 and guide 113. The pinch roller 112 and the guide 113 are disposed on the leading edge of the cartridge whereat the cartridge sidewall is cutaway or disposed with and the endless tape 111 is extended from the center of the hub of the reel (not shown) about the guide 113 and thence about the pinch roller 112 back to the outer periphery of a roll formed by the tape wound about the hub. When the tape cartridge 111 is in the playing position, the magnetic tape 111 engages the magnetic head 66 at the same time the pinch roller 112 is pressed against the capstan 22, clamping the magnetic tape therebetween, with sufficient pressure so that rotation of the capstan imparts translating movement to the tape. The manner in which the tape cartridge 110 is played will be readily understood by those skilled in the art and further description thereof is not deemed necessary for an understanding of the present invention.

A frictional wheel 115 which normally abuts against the capstan 22 and is rotatably driven thereby, is rotatably mounted on a rotary shaft 114. Mounted on the rotary shaft 114 is a wheel 116 of smaller diameter than the frictional wheel 115. Since the frictional wheel 115 has a larger diameter as compared with the capstan 22, rotation of the capstan 22 is decreased and imparted to the wheel 116 so that the wheel 116 is rotated at a lower speed than the capstan 22 in the direction reversed to that of the capstan. The wheel 116 has a diameter as approximately the same as the capstan 22 so that the periphery speed of the wheel 116 is less than that of the capstan 22. The wheel 116 is spaced away from the capstan 22 to allow their axes to be parallel to each other. The idler wheel 31 on the swing lever 27 is between the capstan 22 and the wheel 116, and the idler wheel 31 selectively abuts against the capstan 22 or the wheel 116 as the swing lever 27 is swung. Abutment of the idler wheel 31 with the capstan 22 imparts rotation of the capstan 22 to the operating shaft 49 of the tuning element 48 via the idler wheel 31, pulley 36, belt 39, pulleys 37, 38, belt 45, and the drum 46 to rotate the operate shaft 49. When the idler wheel 31 abuts against the wheel 116, rotation of the wheel 116, is imparted to the operating shaft 49 of the tuning element as in the same manner in which the idler wheel 31 abuts against the capstan 22 thereby rotating the shaft 49. Then the idler wheel 31 abuts against the wheel 116, the operating shaft 49 of the tuning element 48 is rotated in the reversed direction and at a lower speed than when the idler wheel abuts against the capstan 22. That is, when the idler wheel 31 abuts against the capstan 22, the operating shaft 49 of the tuning element 48 is rotated at high speed as in the same manner in FIG. 1 when the idler wheel 31 abuts against the pressure roller 20, and on the other hand when the idler wheel 31 abuts against the wheel 116, the operating shaft 49 is rotated at low speed as in the same manner in FIG. 1 when the idler wheel 31 abut against the wheel 24.

Although not illustrated in FIG. 3, the magnetic tape playing apparatus with radio receiver has a manually operated actuating rod (corresponding to the pushrod 50 in FIG. 1) manually operated for operating the lever 33, a disc (corresponding to the disc 56 in FIG. 1) rotatable whenever the actuating rod is operated, and parts corresponding to the parts in FIG. 2, respectively.

It will readily understood without further explanation that the magnetic tape playing apparatus with radio receiver is also such that, as in the same as the apparatus in FIGS. 1 and 2, the radio receiver can automatically tune with the desired broadcasting radio wave.

The invention and its attendant advantages will be understood from the foregoing description. It is to be understood that change and variations may be made without departing from the spirit and scope of the invention as defined in the appended claims.

What I claim is:

1. An automatic tuning apparatus for a radio receiver in combination with a magnetic tape player, the magnetic tape player having magnetic tape drive means including a capstan, the radio receiver including a radio receiving circuit having a tuning element provided with an operating shaft to vary the receiving frequency, comprising:

first and second rotary members;

first and second transmission means for imparting the rotational force of said magnetic tape drive means to the said first and second rotational members, respectively, said second transmission means being adapted to rotate said second rotary member at lower speed than said first rotary member and in the direction reverse thereto, said second rotary member and said first rotary member being spaced from each other;

a pivotally movable swing lever, an idler wheel mounted on said swing lever and adapted to be driven by abutment against said first or second rotary member;

a latch member adapted to engage said swing lever and to maintain said swing lever in a position where said idler wheel abuts against neither said first nor said second rotary member, said latch member being normally biased to a first position where said latch member engages said swing lever;

a manually actuated actuating member for moving said latch member from said first position to a second position where the latch member is disengaged from said swing lever, said latch member being adapted to be returned to said first position when said actuating member is released;

means for moving said swing lever after disengagement from said latch member to bring and retain said idler wheel into abutment with said first rotary member, whereby said idler wheel is rotated at high speed by said first rotary member;

a third transmission means for imparting rotation of said idler wheel to said operating shaft of said tuning element;

a sensing circuit for producing an electrical pulse signal in response to sensing that said radio receiver circuit is tuned to a broadcasting radio wave;

an electromagnetic device for magnetically moving said swing lever in response to the electric pulse signal to disengage said idler wheel and said first rotary member and to bring and retain said idler wheel into abutment against said second rotary member, said second rotary member being adapted to rotate said operating shaft to a position overrunning a position where said radio receiving circuit is tuned to said broadcasting radio wave, said electromagnetic device being responsive to the next electric pulse signal generated from said sensing circuit to release engagement of said idler wheel and said second rotary member, and means for moving said swing lever, after the disengagement of said idler wheel and said second rotary member, into engagement with said latch member in the first position.

2. An automatic tuning apparatus for the radio receiver in combination with a magnetic tape player in accordance with claim 1, wherein said first rotary member is a pressure roller adapted to abut against said capstan incorporated in said magnetic tape drive means, said second rotary member is a wheel, and a speed reducing device is provided to connect said wheel to said pressure roller.

3. An automatic tuning apparatus for a radio receiver in combination with a magnetic tape player in accordance with claim 1 wherein said first rotary member is said capstan incorporated in said magnetic tape drive means, said second rotary member comprises a shaft, a frictional wheel rotatable with said shaft and adapted to abut against said capstan, and a wheel of smaller diameter than the capstan mounted on said shaft.

4. An automatic tuning apparatus for a radio receiver in combination with a magnetic tape player in accordance with claim 1, wherein said electromagnetic device comprises a magnetic core, a first coil wound on said magnetic core and adapted to be normally supplied with a weak current, and a second coil wound on said magnetic core adjacent said first coil, a changing switch for selectively applying a large current to said first coil or current to said second coil, said changing switch being adapted to be operated by said swing lever in response to the electric pulse signal generated from said sensing circuit, said swing lever being adapted to be attractively moved by the strong magnetic flux generated from said first coil when the large current is applied thereto to a location where the idler wheel engages the second rotary member, said swing lever being adapted to be retained at said location by the magnetic flux normally generated from said first coil due to the weak current, said second coil being adapted to generated a magnetic flux cancelling the magnetic flux generated from said first coil by the weak current in response to said electric pulse signal whereby engagement of the electromagnetic device with said swing lever is released and said swing lever is moved to engage the latch member in the first position.

5. An automatic tuning apparatus for a radio receiver in combination with a magnetic tape player in accordance with claim 4, wherein said actuating member includes a ratchet wheel adapted to be rotatable from a predetermined initial position step by step with respect to movement of said actuating member whenever said actuating member is manually operated, spring means urging said ratchet wheel to said initial position, a plunger engageable with teeth of said ratchet wheel, said actuating member further including a solenoid for permitting return of said ratchet wheel by said spring means by one step in response to the electric signal from said sensing circuit, a member rotatable with said ratchet wheel, and an electric switch adapted to be actuated by the member for effecting switchover in which the output of said sensing circuit is applied to said electromagnetic device when said ratchet wheel is in the initial position and the output of said sensing circuit is applied to said solenoid when said ratchet wheel is out of the initial position, the tuning being effected by running over the broadcasting radio waves in number designated by operating said actuating member.